United States Patent
Sullivan

(10) Patent No.: US 8,128,063 B2
(45) Date of Patent: Mar. 6, 2012

(54) EROSION RESISTANT POWER GENERATION COMPONENTS

(75) Inventor: Dennis Sullivan, Effingham, IL (US)

(73) Assignee: Ameren Corporation, St. Louis, MO (US)

( * ) Notice: Subject to any disclaimer, the term of this patent is extended or adjusted under 35 U.S.C. 154(b) by 969 days.

(21) Appl. No.: 12/062,194

(22) Filed: Apr. 3, 2008

(65) Prior Publication Data

US 2008/0277616 A1   Nov. 13, 2008

Related U.S. Application Data

(60) Provisional application No. 60/909,837, filed on Apr. 3, 2007.

(51) Int. Cl.
*F16K 25/00*  (2006.01)
(52) U.S. Cl. ............. 251/368; 427/405; 427/419.7; 428/665; 428/627; 428/680
(58) Field of Classification Search .......... 251/368; 427/404, 405, 419.7; 428/546, 627, 665, 428/678, 680
See application file for complete search history.

(56) References Cited

U.S. PATENT DOCUMENTS

| 4,776,765 A | * | 10/1988 | Sumner et al. ............ 416/241 R |
| 2007/0269676 A1 | | 11/2007 | Singer et al. |
| 2008/0102296 A1 | * | 5/2008 | Ghasripoor et al. .......... 428/469 |

FOREIGN PATENT DOCUMENTS

EP   0819777   *   1/1998

OTHER PUBLICATIONS

Conforma Clad WC 200 Tungsten Carbide-Nickel Cladding, Apr. 1, 2007 (or earlier), 2 pages.

* cited by examiner

*Primary Examiner* — John Fristoe, Jr.
*Assistant Examiner* — Marina Tietjen
(74) *Attorney, Agent, or Firm* — Senniger Powers LLP

(57) ABSTRACT

A power generation system valve stem comprising a nickel-based substrate and a WC-based coating thereon, wherein the WC based coating comprises WC particles in a matrix of Ni and/or Co wherein the average interfacial spacing between the WC particles is between 5 microns and about 20 microns on average.

2 Claims, 3 Drawing Sheets

EROSION RESISTANT POWER GENERATION COMPONENTS

REFERENCE TO RELATED APPLICATION

This application claims priority from U.S. provisional application 60/909,837 filed Apr. 3, 2007, the entire disclosure of which is incorporated by reference.

FIELD OF THE INVENTION

This invention relates to components such as valve stems and bypass discs which direct steam into a turbine of a power generation system or otherwise contact the steam.

BACKGROUND OF THE INVENTION

Turbine valve stems and associated turbine valve bypass discs employed in connection with steam power generation systems suffer from erosion due to iron oxide particles such as magnetite particles entrained in the steam passing through the valves. The steam can have a temperature of up to 1000 F, pressure of up to 2500 psig, and be traveling at a rate of up to 3000 ft/second. Heretofore, these valve stems have been constructed of low alloy steels with a wear-resistant coating thereon. The low alloy steels have had adequate strength at the required service temperatures of 1000 F.

SUMMARY OF THE INVENTION

Briefly, therefore, the invention is directed to a power generation system valve stem comprising a nickel-based substrate and a WC-based coating thereon, wherein the WC based coating comprises WC particles in a matrix of Ni and/or Co wherein the average interfacial spacing between the WC particles is between 5 microns and about 20 microns on average.

The invention is also directed to a method for directing steam in a power generation system comprising placing a valve stem in the path of said steam, wherein the valve stem is a Ni-based substrate with a WC-based coating thereon, wherein the WC-based coating comprises WC particles in a matrix of Ni and/or Co wherein the average interfacial spacing between WC particles is between about 10 microns and about 20 microns, the WC particles occupy between about 85% and about 95% by volume of the coating, and the WC particles have an average diameter between 15 and about 65 microns, wherein the steam comprises magnetite particles.

Other objects and features will be in part apparent and in part pointed out hereinafter.

DETAILED DESCRIPTION OF PREFERRED EMBODIMENTS

Figure 1:
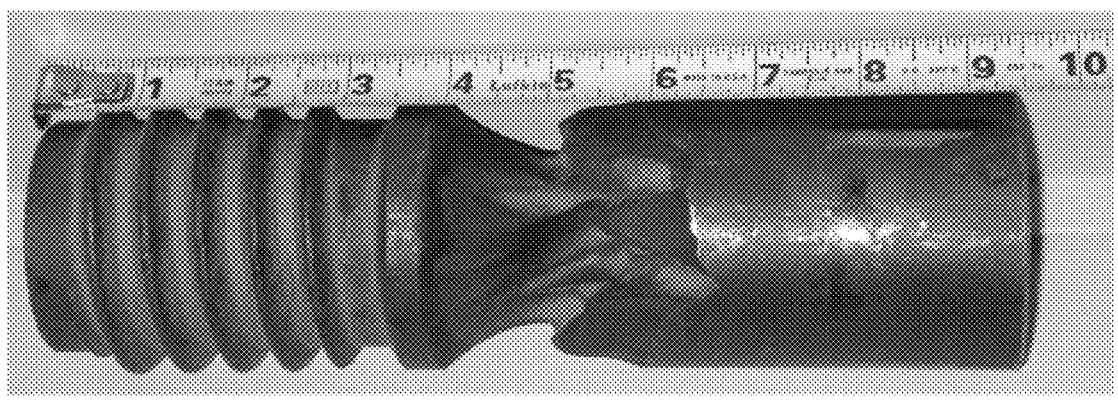
FIG. 1 is a photograph of a turbine valve stem.
Figure 2:
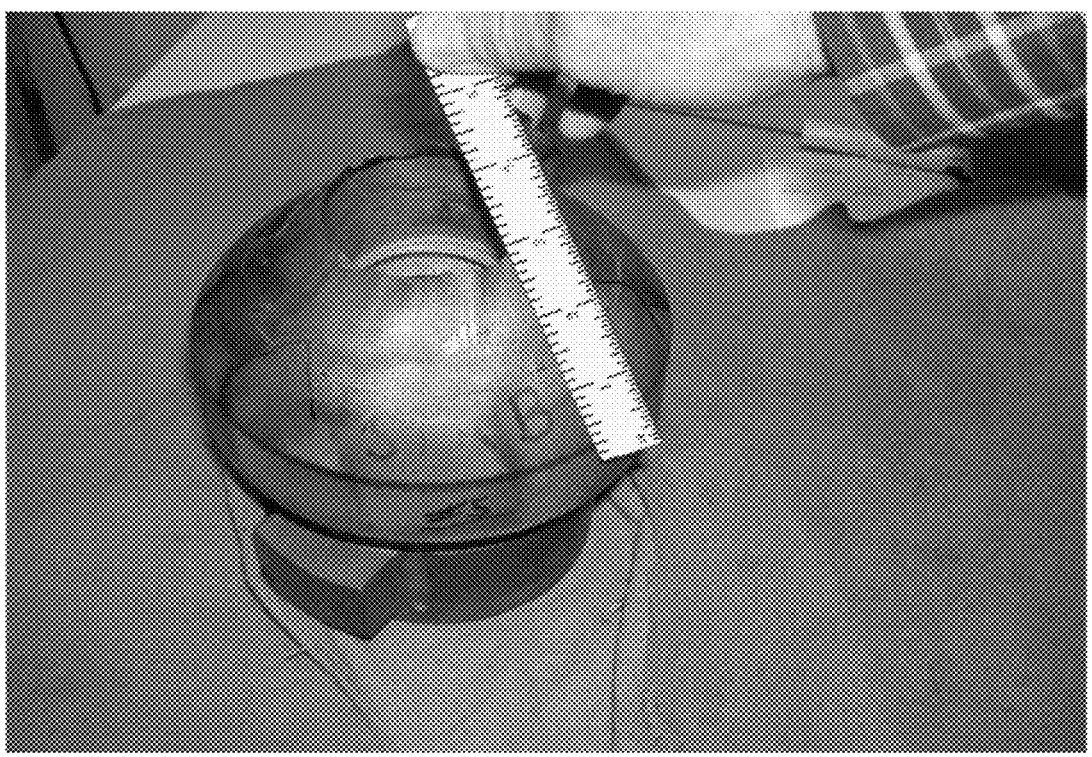
FIG. 2 is a photograph of a turbine valve bypass disc.

In accordance with this invention, a turbine valve stem (FIG. 1) and a turbine valve bypass disc (FIG. 2) for a steam power generation system are constructed from a high-nickel alloy such as those of the Inconel series and are coated with a coating comprising tungsten carbide (WC) particles in a Ni and/or Co matrix.

In selecting the WC-based material, it has been discovered that the eroding media traveling through the turbine system consists largely of magnetite particles which form on the inside surface of boiler tubes. Oxidation of the iron-based tube material to magnetite is accompanied by localized expansion, such that magnetite particles flake off and become entrained in the steam. It has been discovered that these particles break into substantially two particle-size distributions: about 5 microns and 20 microns. The particles are largely planar, irregular, and not spherical, with the micron measurement corresponding to their largest dimension. It was also discovered that the 20-micron particles—those with a particle size between about 16 and about 24 microns—do the majority of the damage downstream in the valve stem and bypass disc. The 5-micron particles—those with a particle size between about 3 and about 7 microns.

Figure 3:
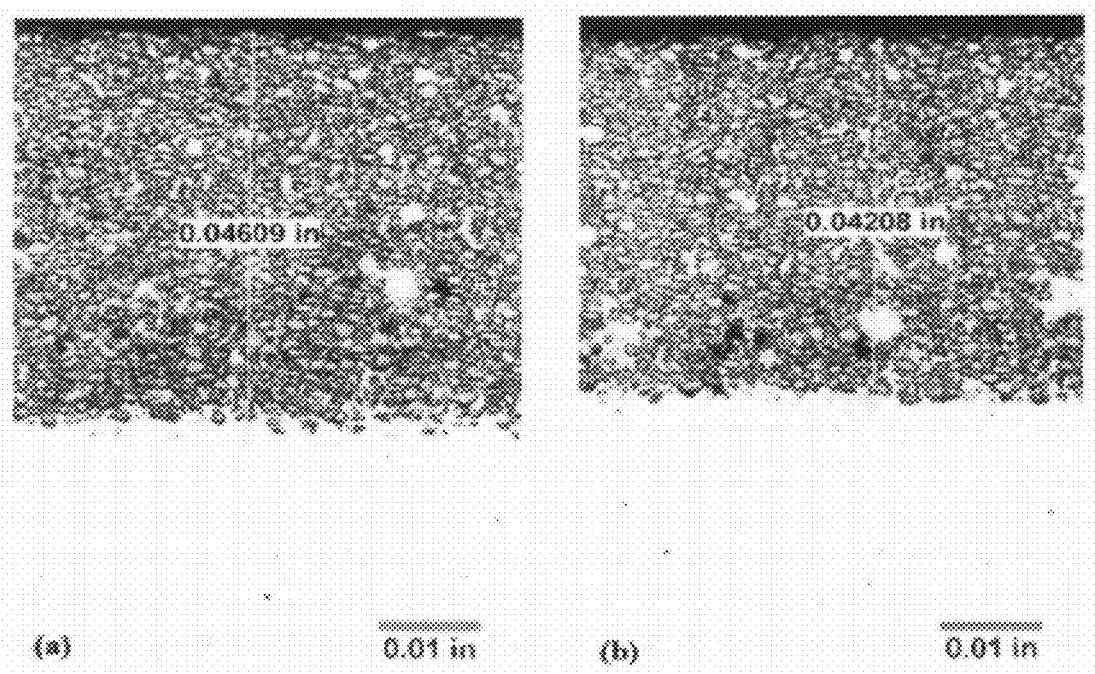
FIG. 3 is a metallographic illustration of a material cross-section.

The proportion of, size of, and distance between the WC particles are selected so as to maximize the volume of the erosion-resistant hard WC particles while retaining sufficient proportion of Ni and/or Co in the matrix to hold the hard particles in place, achieve an interface distance sufficiently below 20 microns to minimize impact of 20-micron size magnetite particles, and retain a low diameter to minimize exposed Co/Ni matrix material where four WC particles come together. But the WC particles must be of sufficient size to be wettable by the Ni and/or Co matrix. In a preferred embodiment, the WC particles occupy between about 75 and about 95% volume of the material, more preferably between about 80 and about 95% volume, most preferably between about 85 and about 95% by volume. The relative two-dimensional areas of the WC particles and the Co binder, as shown by a polished metallography sample in cross section such as FIG. 3, approximate the relative volumes. The WC particles are preferably substantially spherical as shown in FIG. 3 with an average largest cross-sectional dimension (loosely referred to as "diameter") of between 15 and about 65 microns, for example between about 20 and about 45 microns. And in a preferred embodiment, the average interfacial difference (tangential approach distance) between WC particles when viewed in cross-section as in FIG. 3 is between 5 and about 20 microns, for example between about 10 and about 20 microns. In this preferred embodiment, the coating thickness is as in one preferred embodiment, between about 0.02 and about 0.06 inch (0.04609 and 0.04208 inch).

The preferred substrate material is a high-nickel alloy material such as those of the Inconel 900 series. In one preferred embodiment, the substrate material is Inconel 925. Low alloy steels are specifically avoided for the valve stems and bypass discs of the invention. While low alloy steels have sufficient strength for the service environment of on the order of 1000 F, they do not have sufficient strength to withstand sintering temperatures of on the order of 2100 F required to sinter the WC-based coating of the invention onto the component.

In making the invention, the basic valve stem or bypass disc is forged and machined from Ni-based material according to conventional practice. The coating is prepared first in so-called "green" form according to accepted powder metallurgical technology with the Ni and/or Co particles, WC particles, and green binder particles (e.g., teflon) mixed and pressed into a green form. Here this green form is a pliable film. The pliable film is applied to the component surface. Then the component with the pliable film is sintered under pressure at a temperature of about 2150 F. The binder is vaporized and removed exhausted from the furnace. The Ni and/or Co wets and holds the WC particles in place. It also wets to the Ni-based substrate, with diffusion across the interface and a diffusion-based weld to the Ni-based substrate. This imparts a uniform coating characterized in one aspect by an absence of internal layering. In applying the coating, therefore, alternative processes such as plasma coating which yield internal layering are specifically avoided.

In carrying out the invention, the components of the invention are installed in a power generation system where the components encounter steam having a temperature of up to 1000 F, a pressure of up to 2500 psig, and travel speed of up to 3000 ft/second. Accordingly, at any particular time the components will encounter conditions including, for example, a temperature of 950 F, a pressure of 2450 psig, and a steam speed of 2900 ft/sec. Of course there will be times when the conditions are lower. So when it is stated that the components "encounter conditions including a temperature of 950 F, a pressure of 2450 psig, and a steam speed of 2900 ft/sec.," it is meant that at given times these conditions are encountered, though not necessarily all at the same time, and not necessarily for sustained periods of time precisely at these data points. So this encompasses conditions, for example, where the temperature ramps up through 950 F and then is sustained in the 980 to 1000 F range.

The steam conditions encountered by the components further include entrained magnetite particles with a particle size between about 16 and about 24 microns, and entrained magnetite particles with a particle size between about 3 and about 7 microns and a particle velocity. Under certain circumstances, at least about 50% by weight of the entrained magnetite particles have a particle size between about 16 and about 24 microns.

In view of the above, it will be seen that the several objects of the invention are achieved and other advantageous results attained.

When introducing elements of the present invention or the preferred embodiment(s) thereof, the articles "a", "an", "the" and "said" are intended to mean that there are one or more of the elements. For example, that the foregoing description and following claims refer to "a" layer means that there can be one or more such layers. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

The invention claimed is:

1. A method for directing steam in a power generation system comprising placing a valve stem in the path of said steam, wherein the valve stem is a Ni-based substrate with a WC-based coating thereon, wherein the WC-based coating comprises WC particles in a matrix of Ni and/or Co wherein the average interfacial spacing between WC particles is between about 10 microns and about 20 microns, the WC particles occupy between about 85% and about 95% by volume of the coating, and the WC particles have an average diameter between 15 and about 65 microns, wherein the steam comprises magnetite particles;

wherein the valve stem encounters steam at conditions of a temperature of 950 F, a pressure of 2450 psig, and a steam speed of 2900 ft/sec.

2. A method for directing steam in a power generation system comprising placing a valve stem in the path of said steam, wherein the valve stem is a Ni-based substrate with a WC-based coating thereon, wherein the WC-based coating comprises WC particles in a matrix of Ni and/or Co wherein the average interfacial spacing between WC particles is between about 10 microns and about 20 microns, the WC particles occupy between about 85% and about 95% by volume of the coating, and the WC particles have an average diameter between 15 and about 65 microns, wherein the steam comprises magnetite particles;

wherein at least about 50% by weight of said magnetite particles have a particle size between about 16 and about 24 microns.

* * * * *